(12) United States Patent
Matteucci

(10) Patent No.: US 7,143,801 B2
(45) Date of Patent: Dec. 5, 2006

(54) SPINDLE FOR FASTENING RIMS OF VEHICLE WHEELS ON REPAIR SHOP MACHINES

(75) Inventor: Marco Matteucci, Rio Saliceto (IT)

(73) Assignee: Sicam S.R.L., Correggio (IT)

( * ) Notice: Subject to any disclaimer, the term of this patent is extended or adjusted under 35 U.S.C. 154(b) by 0 days.

(21) Appl. No.: 11/087,516

(22) Filed: Mar. 24, 2005

(65) Prior Publication Data
US 2005/0199349 A1    Sep. 15, 2005

(30) Foreign Application Priority Data
Mar. 11, 2004    (IT) .......................... MO20040006 U

(51) Int. Cl.
*B60B 30/06*    (2006.01)
*B60C 25/00*    (2006.01)
(52) U.S. Cl. ........................... 157/16; 157/14; 157/19; 157/20; 279/106
(58) Field of Classification Search ................. 157/14, 157/16, 19, 20, 21; 279/106
See application file for complete search history.

(56) References Cited

U.S. PATENT DOCUMENTS 2,448,881 A * 9/1948 Glynn ........................ 279/106
5,219,012 A * 6/1993 Corghi ......................... 157/19
6,126,174 A * 10/2000 Reece et al. ................ 279/2.24
6,918,599 B1 * 7/2005 Patterson et al. ........... 279/106

FOREIGN PATENT DOCUMENTS

| EP | 0 042 363 A | 12/1981 |
|---|---|---|
| EP | 1 040 941 A | 10/2000 |
| EP | 1 155 880 A | 11/2001 |

\* cited by examiner

*Primary Examiner*—Joseph J. Hail, III
*Assistant Examiner*—Shantese McDonald
(74) *Attorney, Agent, or Firm*—Browdy and Neimark, PLLC

(57) ABSTRACT

A spindle for fastening rims of vehicle wheels on repair shop machines, which comprises a frame that can be associated rotationally about a working axis with a repair shop machine, six or more movable arms that are associated with the frame, are distributed around the working axis and can rotate about respective rotation axes that lie on a plane that is substantially perpendicular to the working axis, and claws for gripping the rim of a vehicle wheel, which are associated with the arms and on which it is possible to fit the internal cylindrical portion of the rim.

13 Claims, 4 Drawing Sheets

SPINDLE FOR FASTENING RIMS OF VEHICLE WHEELS ON REPAIR SHOP MACHINES

The present invention relates to a spindle for fastening rims of vehicle wheels on repair shop machines, particularly for tire changing machines for wheels of trucks, farming and earth-moving vehicles or the like.

BACKGROUND OF THE INVENTION

It is known that repair shops conventionally use machines for performing repairs and maintenance of vehicle wheels, such as for example tire changing machines, which are designed to fit and remove the tire on and from the rim of the wheel.

These repair shop machines are commonly provided with fixtures for fastening the rim of the wheel being worked, which are turned about a working axis by way of conventional motor means; in practice, the placement of the rim coaxially to said work axis allows to turn the wheel about its own axis.

One particular type of these fixtures is constituted by a self-centering spindle, which has a substantially cylindrical frame and can be associated with the motor means of the machine coaxially to the work axis.

Said frame supports four movable arms, which are arranged symmetrically around the work axis and are mutually offset by 90° of rotation about said axis, each arm supporting in turn a claw for gripping the rim of the wheel.

In particular, the arms are associated with the frame so that they can rotate about respective rotation axes, which are mutually coplanar and perpendicular to the work axis, so as to move the claws away from or toward said axis, respectively in order to push them against the internal cylindrical portion of the rim and allow to grip it, and to separate them from said portion of the rim and release it.

Said known spindles are susceptible of further improvements aimed in particular at increasing their operating efficiency.

The four claws supported on the corresponding arms in fact sometimes do not ensure perfect stability of the rim on the spindle; the wheel can therefore be subjected to undesirable relative movements with respect to the fixture for fastening to the machine.

In this regard, it is noted that even slight relative movements can compromise the correct placement of the wheel with respect to the work axis, with the risk of compromising the correct execution of work.

Besides, it is not possible to exclude the possibility of unexpected separations of the rim from the spindle, which can jeopardize the safety of the personnel assigned to work that is present in the vicinity of the machine.

Moreover, it is noted that if the work axis is substantially horizontal, the arms that support the wheel work substantially in a cantilevered fashion with respect to the frame with which they are associated and can be subjected to even substantial flexural loads, especially if they are used to support very heavy and bulky wheels, such as the wheels of trucks, tractors or the like.

SUMMARY OF THE INVENTION

The aim of the present invention is to provide a spindle for fastening rims of vehicle wheels on repair shop machines that allows to achieve these improvements, allowing to support the wheel in a particularly stable and firm manner, without the danger of the rim moving with respect to it or even separating from it, allowing the operator to perform correct and regular work in particularly safe conditions.

Within this aim, an object of the present invention is to provide a spindle that is simple, relatively easy to provide in practice, safe in use, effective in operation, and has a relatively low cost.

This aim and this and other objects that will become better apparent hereinafter are achieved by the present spindle for fastening rims of vehicle wheels on repair shop machines, comprising a frame that can be associated with a repair shop machine and rotates about a working axis, a plurality of movable arms that are associated with said frame at one end, are distributed around said working axis and can rotate about respective rotation axes that lie on a plane that is substantially perpendicular to said working axis, and claws for gripping the rim of a vehicle wheel, which are associated with said arms, and on which it is possible to fit the internal cylindrical portion of said rim, characterized in that it comprises at least six of said arms.

BRIEF DESCRIPTION OF THE DRAWINGS

Further characteristics and advantages of the present invention will become better apparent from the following detailed description of a preferred but not exclusive embodiment of a spindle for fastening rims of vehicle wheels on repair shop machines, illustrated by way of non-limiting example in the accompanying drawings, wherein.

DESCRIPTION OF THE PREFERRED EMBODIMENTS

Figure 1:
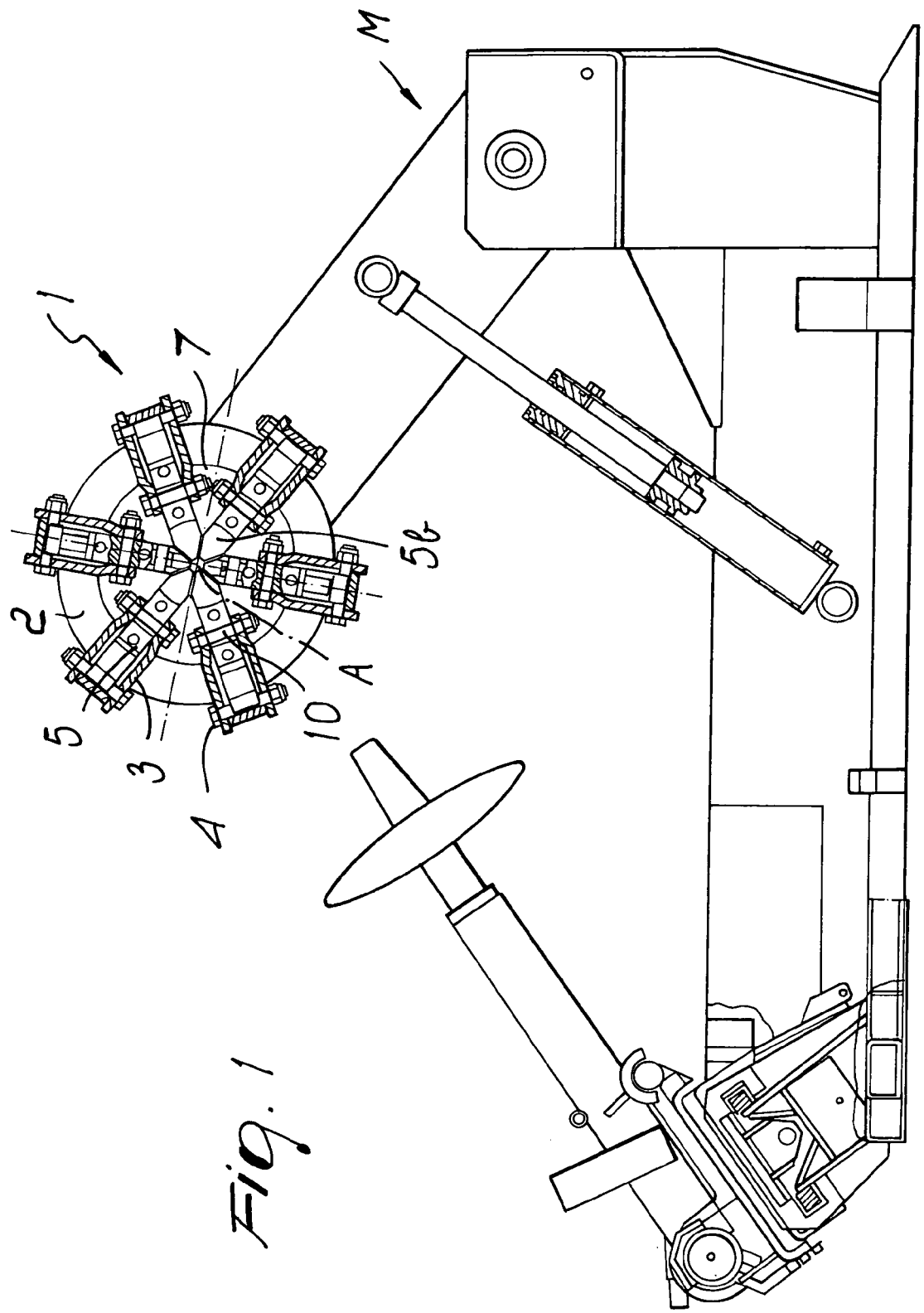
FIG. 1 is a schematic and partially sectional front view of the spindle according to the invention applied to a tire changing machine.
Figure 2:
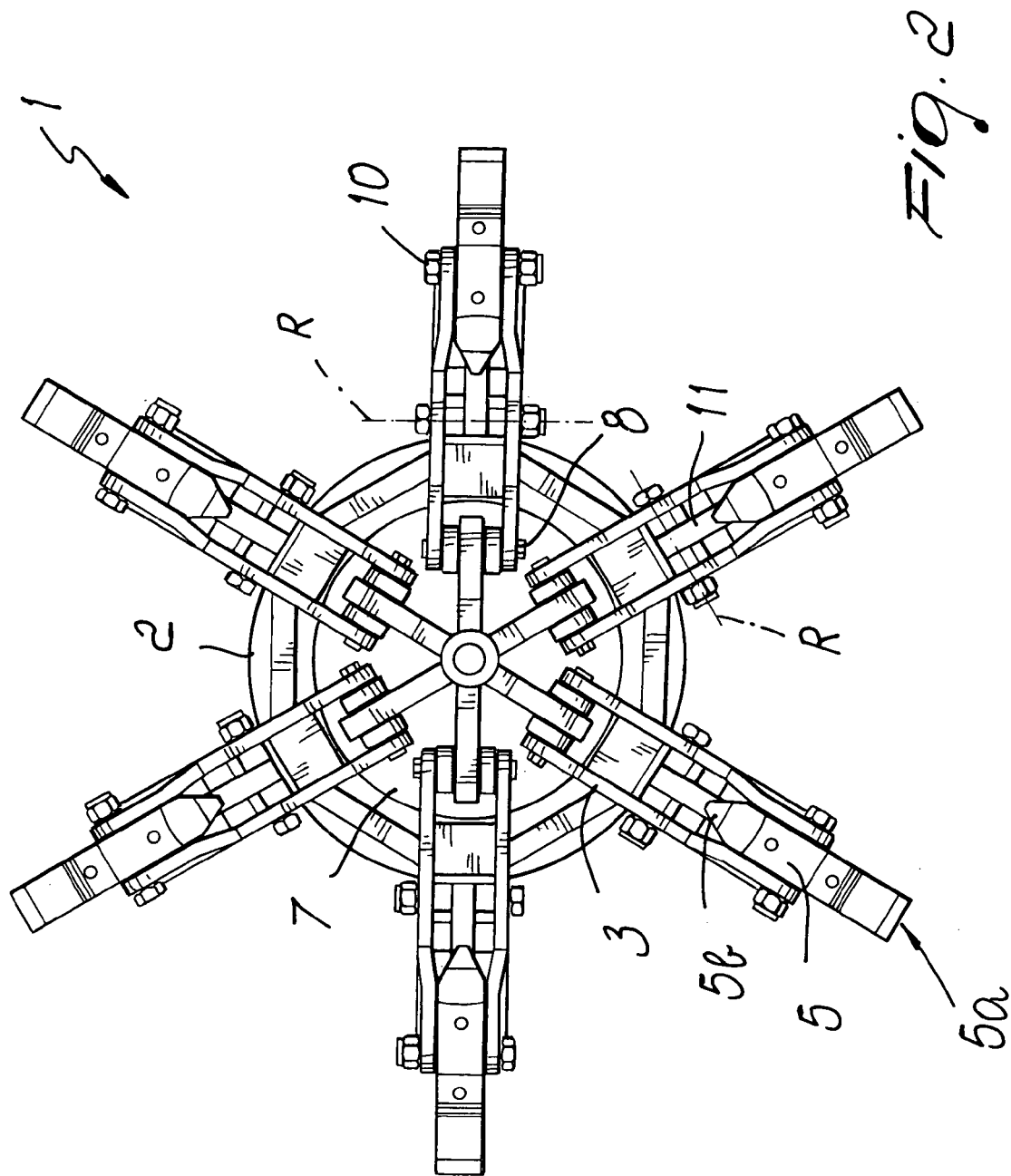
FIG. 2 is a side view of the spindle according to the invention.
Figure 3:
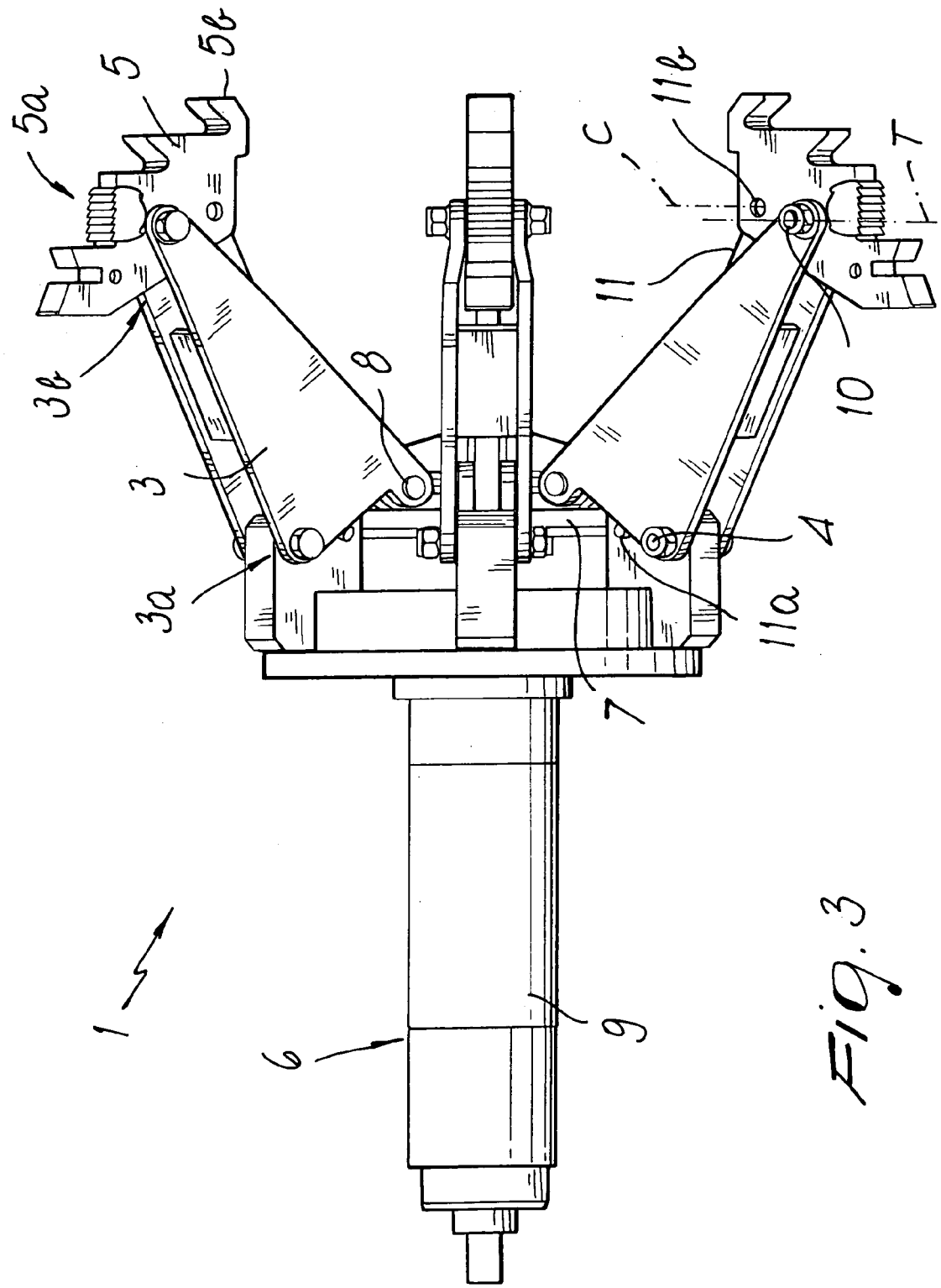
FIG. 3 is a front view of the spindle according to the invention.
Figure 4:
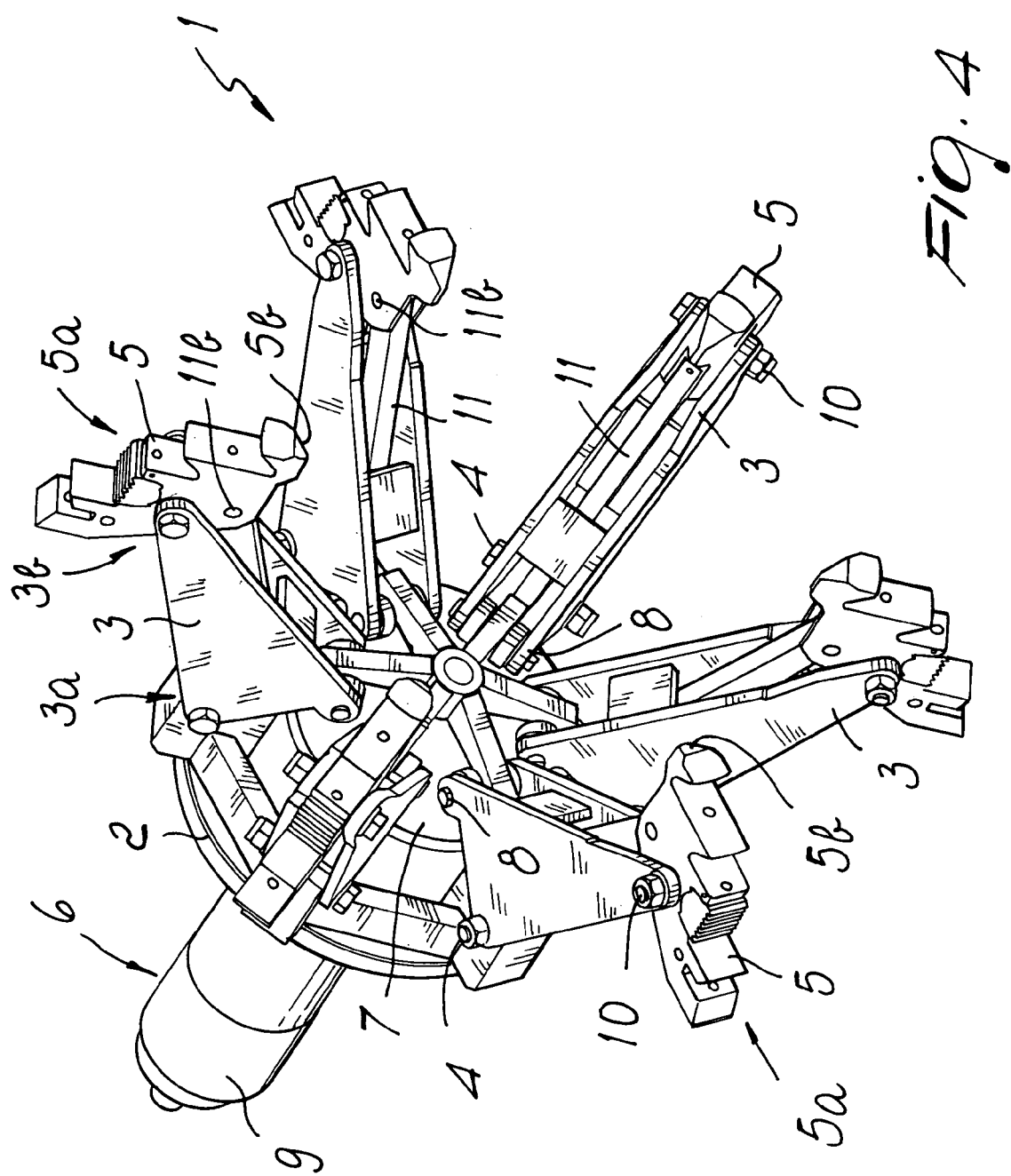
FIG. 4 is a perspective view of the spindle according to the invention.

With reference to the figures, the reference numeral 1 generally designates a spindle for fastening rims of vehicle wheels on repair shop machines.

In the particular application of the present invention shown in FIG. 1, the repair shop machine is constituted by a tire changing machine M, which is designed to fit and remove tires on and from rims of vehicle wheels, but it is intuitive to understand that the spindle 1 can be fitted on any repair shop machine that likewise requires gripping the rims to perform particular work on the wheels.

The spindle 1 comprises a frame 2, which can be associated with the tire changing machine M in order to be turned about a working axis A by way of conventional motor means, which are not illustrated in the figures.

In particular, the frame 2 has an axially symmetrical shape and is constituted by a substantially circular base, the axis of which coincides with the working axis A.

In the particular embodiment shown in FIG. 1, the present invention is associated with the tire changing machine M so that the working axis A is arranged horizontally; however, alternative embodiments are not excluded in which it is for example vertical or in any case inclined, depending on the particular architecture of the machine provided with the spindle 1.

According to the invention, the spindle 1 comprises six or more movable arms 3, each of which is provided with a first end 3a at which it is connected to the frame 2; in the particular embodiment shown in the figures, the present invention is provided exactly with six arms 3, but it can also be provided for example with eight arms.

The first ends 3a of the arms 3, in particular, are associated with the peripheral portion of the base 2 by means of hinges 4, which allow them to rotate about respective rotation axes R that lie on a plane that is perpendicular to the working axis A and are equidistant from said axis.

In particular, the arms 3, as well as the hinges 4, are distributed in a circular arrangement around the working axis A, spaced from each other with a constant pitch defined by rotation angles about said axis that are equal to 60° or 45°, depending on whether the spindle 1 is provided with six or eight arms.

A claw 5 for gripping the rim of the wheel is further supported at the end 3b of each arm 3 that lies opposite the first end 3a.

The internal cylindrical portion of the rim of the wheel can be fitted around the claws 5; the side 5a of each claw 5 that lies opposite the working axis A, in particular, is shaped with recesses and protrusions that have different dimensions and shapes in order to facilitate grip on the rims.

The rotation of the arms 3 with respect to the frame 2 in practice is such as to move the claws 5 away from and towards the working axis A, respectively in order to push said claws against the internal portion of the rim and allow its grip and in order to space them from said portion of the rim and release it.

Advantageously, the present invention is provided with rotation actuation means for rotating the arms 3 with respect to the frame 2, which are constituted, for example, by at least one double-acting jack 6, which is aligned along the working axis A and in which the fixed end is associated with the frame 2 and the movable end is provided with a disk 7, to which each arm 3 is connected at a point 8 that is separate from the corresponding hinge 4.

The fixed end of the jack 6, in particular, is formed by a cylinder 9, which is associated coaxially with respect to the base 2 on the opposite side with respect to the arms 3; a conventional hydraulically- or pneumatically-operated piston, not shown in the figures, is arranged so that it can slide within the cylinder 9 and passes through the base 2 and is connected to the disk 7 proximate to the arms 3.

The spindle 1 further includes turning means for turning each one of the claws 5 about a claw turning axis T that is substantially parallel to the rotation axis R formed by the corresponding hinge 4, said turning means being suitable to keep the inclination of said claws with respect to the working axis A unchanged during the movement of the arms 3.

Said turning means are constituted, for each claw 5, by an articulated parallelogram mechanism, which comprises a hinge system 10, which is interposed between said claw and the corresponding arm 3, and a linkage 11, the ends 11a and 11b of which are associated respectively with the frame 2 and with said claw so that they can rotate with respect to claw axes C that are parallel to the rotation axis R formed by the corresponding hinge 4.

Further, each one of the claws 5 comprises a portion 5b that faces the working axis A and has a pointed shape; in particular, if the spindle 1 is provided with six or eight arms 3, the protrusion or projection of each portion 5b on the plane of arrangement of the rotation axes formed by the hinges 4 forms an angle of approximately 60° or 45° of rotation about the working axis A.

Said pointed portions allow to position the claws 5 compactly at the configuration of maximum approach of the arms 3 with respect to the working axis A (FIG. 1).

In practice it has been found that the described invention achieves the proposed aim and object, and in particular the fact is stressed that with respect to known types of spindle it allows to increase considerably the stability of the wheel being treated, making the work performed by the operator easier, more accurate and safer.

The particular refinement of using six or more arms, moreover with respect to the solution provided in known spindles in which there are only four arms, allows to better distribute the forces applied by said arms to the internal cylindrical portion of the rim, allowing better centering of the wheel.

Moreover, it is noted that the present invention is particularly suitable for working with wheels that are very bulky, such as wheels for trucks, tractors or the like, the considerable weight of which can be distributed over a larger number of arms, reducing their load.

The invention thus conceived is susceptible of numerous modifications and variations, all of which are within the scope of the appended claims.

All the details may further be replaced with other technically equivalent elements.

In practice, the materials used, as well as the contingent shapes and dimensions, may be any according to requirements without thereby abandoning the scope of the protection of the appended claims.

The disclosures in Italian Patent Application No. MO2004U000006 from which this application claims priority are incorporated herein by reference.

What is claimed is:

1. A spindle for fastening rims of vehicle wheels on repair shop machines, comprising:
   a frame that is connectable for rotation about a working axis to a repair shop machine;
   at least six movable arms that are associated with said frame at a first end thereof, so as to be distributed around said working axis, and to be rotatable about respective rotation axes that lie on a plane that is substantially perpendicular to said working axis;
   claws for gripping a vehicle wheel rim, which are connected to said arms, and are adapted for fitting thereon an internal cylindrical portion of the wheel rim;
   rotation actuation means for rotating said arms with respect to said frame;
   wherein said rotation actuation means comprise at least one jack, with a fixed end associated with said frame and a movable end associated with at least one of said arms in a point that is located away from a corresponding one of said rotation axes.

2. The spindle of claim 1, comprising six of said arms.

3. The spindle of claim 1, comprising eight of said arms.

4. The spindle of claim 1, wherein said rotation axes are located substantially equidistant from said working axis, around which said arms are distributed in a circular arrangement.

5. The spindle of claim 1, wherein said arms are distributed in a circular arrangement around said working axis with a substantially constant pitch.

6. The spindle of claim 1, wherein said jack is substantially aligned along said working axis.

7. The spindle of claim 1, wherein said movable end of said at least one jack is provided with a disk, each one of said arms being associated to said disk.

8. The spindle of claim 1, further comprising turning means for turning each one of said claws with respect to the corresponding arm, about a claw turning axis that is substantially parallel to the corresponding rotation axis, said turning means being adapted to maintain inclination of said claws with respect to said working axis during movement of said arms.

9. The spindle of claim 8, wherein turning means are of an articulated-parallelogram type.

10. The spindle of claim 8, wherein said turning means comprise, for each one of said claws, at least one linkage with ends thereof associated respectively with said frame and with said claw, said linkage being rotatable with respect to claw axes that are substantially parallel to the corresponding claw turning axis.

11. The spindle of claim 10, wherein each of one of said claws comprises a portion that faces said working axis and has a substantially pointed shape.

12. The spindle of claim 11, wherein projection of said pointed shaped portions on said plane of arrangement of the rotation axes forms substantially an angle of 60° of rotation about said working axis, six of said arms being associated with said frame.

13. The spindle of claim 11, wherein projection of said pointed shaped portions on said plane of arrangement of the rotation axes forms substantially an angle of 45° of rotation about said working axis, eight of said arms being associated with said frame.

* * * * *